United States Patent [19]

Pelensky

[11] Patent Number: 5,192,132

[45] Date of Patent: Mar. 9, 1993

[54] TEMPERATURE MONITORING OF A FIXED-BED CATALYTIC REACTOR

[75] Inventor: Martha T. Pelensky, Yardley, Pa.

[73] Assignee: Mobil Oil Corporation, Fairfax, Va.

[21] Appl. No.: 808,794

[22] Filed: Dec. 12, 1991

[51] Int. Cl.$^5$ .................. G01K 07/06; G01N 25/20
[52] U.S. Cl. ...................... 374/166; 136/230; 374/179; 436/147
[58] Field of Search .............. 374/110, 137, 166, 179; 136/212, 230; 60/276; 422/98; 436/152

[56] References Cited

U.S. PATENT DOCUMENTS

| | | | |
|---|---|---|---|
| 2,497,053 | 2/1950 | Wills | 374/179 X |
| 2,695,219 | 11/1954 | Upham | 374/110 X |
| 2,811,856 | 11/1957 | Harrison | 374/179 X |
| 3,263,502 | 8/1966 | Springfield | 136/224 X |
| 3,282,107 | 11/1966 | Ekstrom, Jr. | 374/179 X |
| 4,242,907 | 1/1981 | Kazmierowicz | 374/137 |
| 4,440,509 | 4/1984 | Agarwal | 436/149 X |
| 4,472,594 | 9/1984 | Ishida | 374/179 X |
| 4,595,300 | 6/1986 | Kaufman . | |
| 4,653,935 | 3/1987 | Daily et al. | 374/137 X |
| 4,750,357 | 6/1988 | Anderson et al. . | |
| 5,064,506 | 11/1991 | Sparenberg et al. | 374/110 X |

Primary Examiner—Daniel M. Yasich
Attorney, Agent, or Firm—Alexander J. McKillop; Dennis P. Santini; Malcolm D. Keen

[57] ABSTRACT

A thermowell for a fixed-bed reactor which has a vertical spine portion, and multiple spider portions spaced along the spine portion. At least one thermocouple and preferable a plurality of thermocouples are located in each arm of the spider portions with thermocouple leads extending upwardly through the spine portion to a monitor outside of the reactor. The thermowell is constructed in the reactor while loading the catalyst by first positioning the spine portion in the reactor, and then fabricating a spider portion at the lowermost level of the spine portion with at least one thermocouple in each arm of the spider portion and thermocouple leads extending through the arms and upwardly through the spine portion. Catalyst is then added to the reactor to cover the spider portion at the lowermost level. At each successive level, repeating the steps of fabricating another spider portion, and of adding catalyst to cover the spider portion.

16 Claims, 2 Drawing Sheets

TEMPERATURE MONITORING OF A FIXED-BED CATALYTIC REACTOR

BACKGROUND OF THE INVENTION

1. Field of the Invention

The present invention relates to a thermowell system for monitoring temperatures in a fixed-bed catalytic reactor, and to a method of constructing such a system. More particularly, the present invention relates to a multi-level thermowell for a fixed-bed reactor, and to a method of assembling the thermowell within the reactor.

2. Description of Prior Art

Fixed-bed catalytic reactors are widely used in hydrocarbon processing and in the chemical process industry. In the operation of these units, it is desirable to measure temperatures at a plurality of spaced locations in the reactor to obtain a temperature profile(s). Temperature measurements are commonly made by moving a thermocouple to various positions within a vertical thermowell, or by positioning multiple thermocouples along the height of the vertical thermowell. Since temperature monitoring throughout the catalyst bed is critical, several vertical thermowells may be installed at specified distances from each other. The number of thermowells will depend on the nature of the catalytic reaction, and on the diameter of the reactor.

Lateral thermowells are also known but will provide a temperature profile in only one plane transverse to fluid flow. Further, lateral thermowells raise mechanical difficulties and expense to install them laterally from the sides of the reactor.

U.S Pat. No. 4,595,300 discloses a system for moving a thermocouple within a vertical thermowell, and U.S. Pat. No. 4,750,357 provides for using multiple thermocouple transverse probes to obtain temperature readings which are in turn used to calculate fluid flow rates.

SUMMARY OF THE INVENTION

In accordance with a broad aspect of the present invention, there is provided a system for monitoring temperatures in a fixed-bed catalytic reactor comprising a central thermal sensor conduit extending axially within the bed of catalyst, and a plurality of arrays of lateral thermal sensor conduits spaced along the central conduit with the lateral conduits extending outwardly, preferably radially outwardly, from the central conduit. At least one thermal sensor is in each lateral conduit, and thermal sensor leads connected to the thermal sensors extend through the central conduit to a monitor outside of the reactor.

In accordance with another broad aspect of the present invention there is provided a method of arranging thermal sensors in a fixed-bed catalytic reactor wherein a central thermal sensor conduit is positioned within the reactor. The central conduit has a plurality of openings at each of a plurality of levels. Thermal sensors are located at each level outside of the central conduit, and thermal sensor leads are extended from respective thermal sensors through the openings and upwardly within the central conduit. At the lowermost level, at least one thermal sensor is placed into each one of a plurality of lateral thermal sensor conduits, and each lateral conduit is connected to the central conduit at a respective opening such that the lateral conduits extend outwardly, preferably radially outwardly, from the central conduit. Catalyst is then added to the reactor to cover the lateral conduits at the lowermost level. At each successive level, repeat the steps of inserting thermal sensors into the lateral conduits, connecting the lateral conduits to the central conduit, and adding catalyst to cover the lateral conduits.

In accordance with a more specific aspect of the present invention, there is provided a thermowell for a fixed-bed catalytic reactor, the thermowell having a vertical central spine portion, and multiple spider portions spaced along the spine portion. At least one thermal sensor and preferably a plurality of thermal sensors are located in each arm of the spider portions with thermal sensor leads extending through the arms and upwardly through the spine portion to monitoring means outside of the reactor.

In accordance with another more specific aspect of the present invention, a multi-level thermowell is assembled within a fixed-bed catalytic reactor during catalyst loading of the reactor. The method of assembly includes first positioning a vertical spine portion in the reactor, and then fabricating a spider portion at the lowermost level of the spine portion with at least one thermal sensor in each arm of the spider portion and thermal sensor leads extending through the arms and upwardly through the spine portion to monitoring means outside of the reactor. Catalyst is then added to the reactor to cover the spider portion at the lowermost level. At each successive level, repeating the steps of fabricating another spider portion with at least one thermal sensor and leads in each arm, and of adding catalyst to cover the spider portion.

The thermowell constructed in accordance with the present invention will be embedded in the catalyst with multi-level thermal sensor conduits or arms extending radially towards the sides of the reactor to provide an excellent three-dimensional readout of the temperature profile of the reactor bed. By practicing the instant invention, the catalyst bed will also provide significant structural support for the thermowell.

The increased number of temperature points throughout the catalyst bed provided by the thermowell of this invention leads to improved monitoring and control of the reaction(s). Such improvement is particularly useful for high severity processes, such as hydrocracking or hydrotreating, which require quenching. The improved monitoring and control of the reaction also provides for better detection of hot spots. Further, data collected by use of the present invention would provide a basis for improved reactor and process design. The present invention also avoids the need for expensive and mechanically complicated lateral thermowells. The invention further reduces to one the number of thermowell penetrations of the downcomer tray, the distributor tray or the reactor surface needed to provide an enhanced temperature profile.

DESCRIPTION OF SPECIFIC EMBODIMENTS

Figure 1:
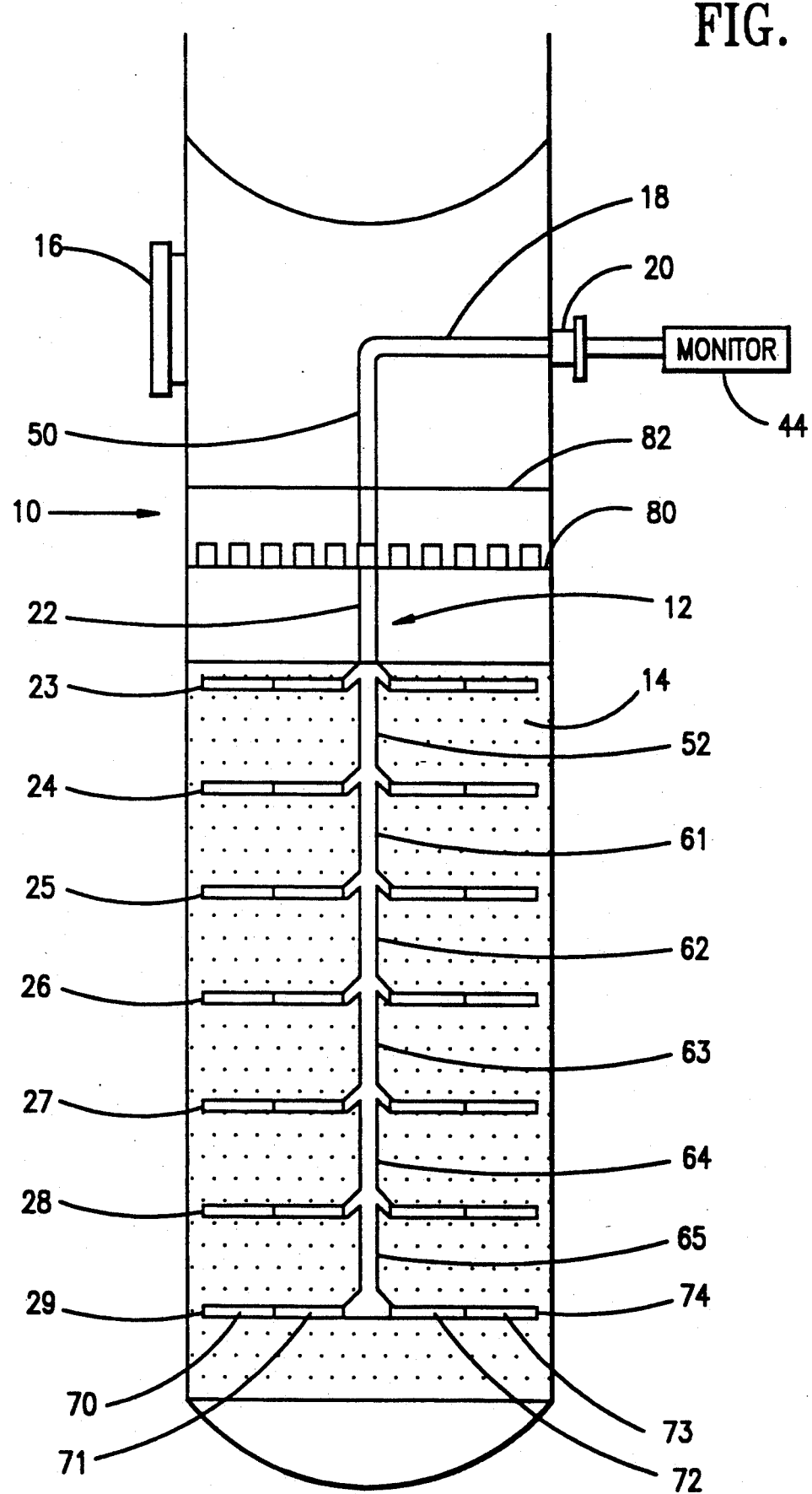
FIG. 1 is a simplified sectional view of the lower bed of a multi-level fixed-bed reactor including an embodiment of a temperature monitoring system in accordance with the present invention.

With reference to FIG. 1, the lower bed of a fixed-bed catalytic reactor 10, such as that used in hydrodewaxing, has therein a multi-level thermowell 12 constructed in accordance with the present invention. The thermowell 12 has a spine portion or central conduit 22 extending from a top lateral portion 18 axially downwardly to the lower area of the catalyst bed 14. A plurality of spiders 23-29 are spaced along the spine portion 22. In this embodiment, each one of the spiders 23-29 is formed by an array (FIG. 2) of six arms or lateral conduits 30-35 extending radially outwardly from the spine portion 22. Each one of the lateral conduits 30-35 has three thermal sensors in the form of thermocouples 36-38 therein with suitable thermocouple leads 40 extending through the lateral conduit 30-35, through openings 42,43 in the spine portion 22, and up the spine portion 22 to means 44 for monitoring temperatures in the reactor 10. Thermocouples 39 are also provided (FIG. 3) in the spine portion 22.

The monitoring means 44 may be in the form of a display, a recorder, a computer for generating a model of the temperature profile and/or a computer for generating a signal(s) to control an aspect(s) of the process. The monitoring means 44 may also be in the form of a junction box connected to any one or combination of foregoing displaying, recording or controlling monitors.

The reactor 10 has a manway 16 to provide personnel access into the reactor 10 during loading and unloading of the catalyst 14. In one embodiment of the present invention, the thermowell 12 is assembled during loading of the catalyst bed 14 by first installing the top lateral portion 18 of the thermowell 12 to the thermowell inlet 20, and then connecting a top portion 50 of the spine portion 22 to the top lateral portion 18 The top portion 50 extends down to the level where the first spider array 23 will be installed. The top of the entire thermocouple assembly is inserted in the top portion 50 with thermocouple leads 40 extending to the monitoring means 44, and appropriate thermocouples 36-38 for the arms 30-35 are threaded through the openings 42, 43 for the first spider array 23.

The thermocouples for the remaining spider arrays 24-29 are threaded through the next vertical portion 52 of the spine portion 22, and this vertical portion 52 is connected to the top portion 50 with the appropriate thermocouples 53-58 threaded through spine openings 59, 60 for the arms of the second spider array 24. These steps are repeated to install the remaining vertical portions 61-65 with thermocouples threaded through spine openings for the remaining spider arrays 25-29.

The thermocouples for the bottom spider array 29 are then inserted in the lateral conduits or arms 70-73 of the bottom spider array 29, and the arms 70-73 are connected to the spine portion 22 with the outer ends 74 of each arm 70-73 being capped off. Catalyst is now loaded in the reactor 10 to cover the bottom spider array 29 while observing all catalyst loading procedures to provide a smooth bed.

Thermocouples are now installed in the arms of the next higher spider array 28, which arms are then capped, connected to the spine portion 22, and covered with catalyst. These procedures are repeated for each of the remaining spider arrays 23-27 to fill the reactor with catalyst. The downcomer tray 80 and the distributor tray 82 are installed, and the manway 16 is sealed. The foregoing steps are simply reversed to dump or unload catalyst.

Figure 2:
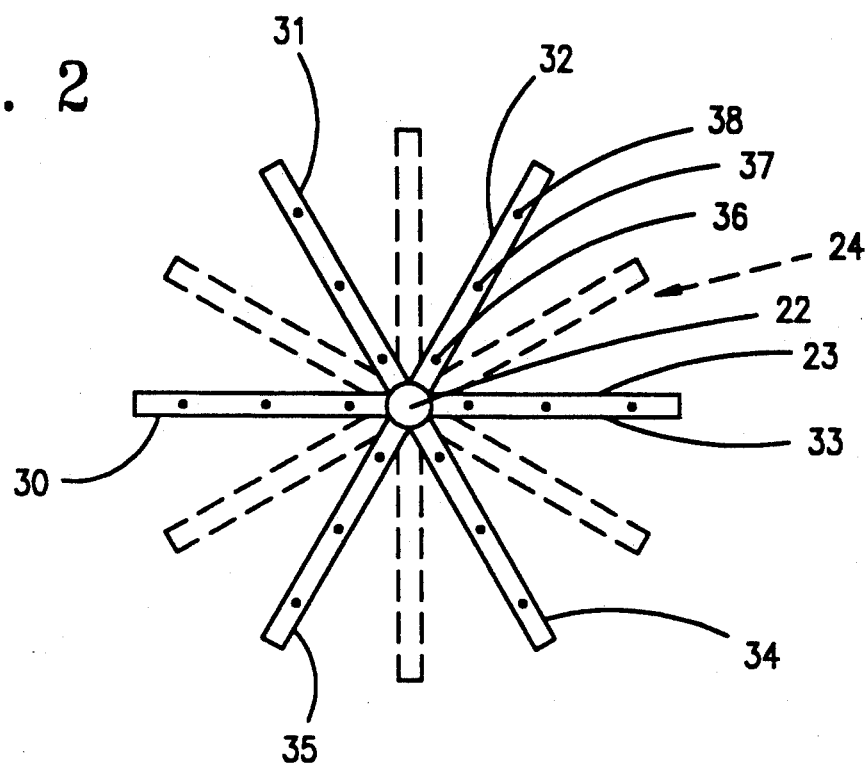
FIG. 2 is a sectional view of only the monitoring system in the reactor taken along line 2—2 of FIG. 1.

The present invention also contemplates an embodiment wherein successive spider arrays are not in vertical alignment. For example, FIG. 2 shows in dashed lines the second spider array 24 angularly offset from the first spider array 23 by 30 degrees.

Figure 3:
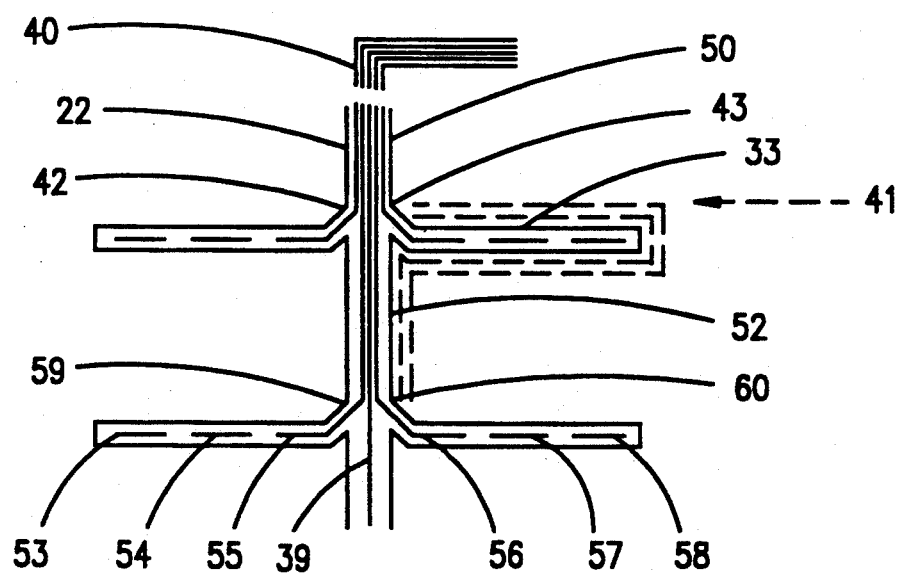
FIG. 3 is a sectional view of the upper two levels of the monitoring system taken along line 3—3 of FIG. 2.

An aspect of the present invention provides that the spine portion and/or the spider arms be formed by a plurality of concentrically arranged tubing. For example, FIG. 3 shows in dashed lines 41 the arm 33 and the spine portion 22 being formed of three concentric pieces of tubing with the thermocouples in the innermost tube.

The multi-level thermowell may be constructed from standard off-the-shelf hardware of pipes, tubes, ell's, tee's, laterals, etc. As is well known in the art, the material of the thermowell must be compatable with the metallurgy of the reactor. The concentrically arranged tubing 41 may be 0.75", 1.00" and 1.50" in diameter.

The method of arranging thermal sensors in a reactor in accordance with the instant invention is applicable to reactors having a sufficiently large diameter to accommodate personnel during catalyst loading.

The number of spider arrays, the number of arms in each array, and the number of thermocouples in each arm and in the spine will depend upon the size of the catalyst bed and the nature of the reaction.

The embodiment shown in the drawings has the arms of each array extending radially outwardly in a horizontal plane. However, the present invention also contemplates each array having a vertical dimension such that arms in the array may be at different levels along the spine portion. Further, it is contemplated that the arms may also extend outwardly and upwardly or downwardly.

Although the thermal sensors used in the specific embodiment are thermocouples, the sensors may be in the form of any component which generates a signal indicative of temperature, such as a resistance temperature detector (RTD).

While particular embodiments of the invention have been shown and described, various modifications are within the true spirit and scope of the invention. The appended claims are, therefore, intended to cover all such modifications.

What is claimed is:

1. A system for monitoring temperatures in an elongated fixed-bed catalytic reactor having a diameter sufficiently large to accommodate personnel during catalyst loading and a manway to provide personnel access to the reactor for assembling a multi-level thermowell therein during catalyst loading, said system comprising:

a central thermal sensor conduit of said thermowell extending vertically within a bed of catalyst in said reactor;

a plurality of arrays of lateral thermal sensor conduits of said thermowell within the bed of catalyst and spaced along said central conduit, each one of said arrays being formed by its respective lateral conduits extending outwardly from said central conduit such that the bed of catalyst provides structural support for said thermowell;

at least one thermal sensor in each of said lateral conduits;

means outside of said reactor for monitoring said thermal sensors;

a thermowell inlet formed in said reactor; and a plurality o thermal sensor leads connected to said thermal sensors and extending upwardly through said central conduit and out said thermowell inlet to said monitoring means.

2. The system of claim 1 wherein each of said lateral conduits comprises a plurality of concentrically arranged tubing, said thermal sensors and respective leads being within the innermost of said tubing.

3. The system of claim 1 wherein said central conduit comprises a plurality of concentrically arranged tubing.

4. The system of claim 1 further comprising a plurality of thermal sensors in said central conduit.

5. The system of claim 1 wherein a plurality of thermal sensors are in each of said lateral conduits.

6. The system of claim 1 wherein said central conduit extends upwardly through the top of the bed of catalyst.

7. The system of claim 1 wherein the lateral conduits of each adjacent array are not in vertical alignment.

8. The system of claim 1 wherein said thermal sensors are thermocouples.

9. A method of assembling a multi-level thermowell in an elongated fixed-bed catalytic reactor having a diameter sufficiently large to accommodate personnel during loading and a manway to provide personnel access to the reactor comprising the steps of:
(a) positioning a central thermal sensor conduit of said thermowell axially within said rector, said central conduit having plurality of openings thereabout at each of a plurality of levels therealong;
(b) locating a plurality of thermal sensors exteriorly of said central conduit at each one of said levels with the respective thermal sensor lead extending through the openings and upwardly within said central conduit, and connecting the thermal sensor leads through a thermowell inlet to means exteriorly of said reactor for monitoring temperatures in said reactor;
(c) at the lowermost level, placing at least one thermal sensor into each one of a plurality of lateral thermal sensor conduits of said thermowell, the lateral conduits corresponding in number to the number of openings at the lowermost level, and connecting each one of the lateral conduits to said central conduit at a respective opening such that said lateral conduits extend outwardly from said central conduit;
(d) adding catalyst to said reactor to cover the lateral conduits connected in step (c) while observing all catalyst procedures to provide a smooth bed; and
(e) repeating steps (c) and (d) at each succeeding level until a full complement of catalyst is loaded in said reactor, and the catalyst bed provides structural support for said thermowell.

10. The method of claim 9, further comprising the steps of:
(f) after step (e), installing at lest one distributor tray in the upper portion of said reactor; and
(g) sealing the manway.

11. The method of claim 10, further comprising capping the outer end of each lateral conduit before it is covered by catalyst.

12. The method of claim 9 wherein each one of said lateral conduits comprises a plurality of concentrically arranged tubing, and wherein said at least one thermal sensor being within the innermost of said tubing.

13. The method of claim 9 said central conduit comprises a plurality of concentrically arranged tubing.

14. The method of claim 9 wherein a plurality of thermal sensors are placed in each one of said lateral conduits.

15. The method of claim 9 wherein the openings at each successive level are radially offset from the preceding level such that the lateral conduits of adjacent levels are not in vertical alignment.

16. The method of claim 9 wherein said thermal sensors are thermocouples.

* * * * *